US007599705B2

(12) United States Patent
Marquis et al.

(10) Patent No.: US 7,599,705 B2

(45) Date of Patent: Oct. 6, 2009

(54) WIRELESS TRANSMITTER AND HEARING SYSTEM

(75) Inventors: François Marquis, Au Champ à la Meilla A (CH); Louis Gerber, Bern (CH)

(73) Assignee: Phonak AG, Stafa (CH)

( * ) Notice: Subject to any disclaimer, the term of this patent is extended or adjusted under 35 U.S.C. 154(b) by 621 days.

(21) Appl. No.: 09/940,401

(22) Filed: Aug. 27, 2001

(65) Prior Publication Data

US 2003/0118199 A1 Jun. 26, 2003

(51) Int. Cl.

| | |
|---|---|
| ***H04B 7/00*** | (2006.01) |
| ***H04B 5/00*** | (2006.01) |
| ***H04H 40/00*** | (2008.01) |
| ***H04R 5/02*** | (2006.01) |
| ***H04R 25/00*** | (2006.01) |
| ***H04R 3/00*** | (2006.01) |

(52) U.S. Cl. ........................ 455/522; 455/69; 455/3.06; 381/79; 381/323; 381/315; 381/311; 381/320; 381/92; 381/122; 381/111; 381/312

(58) Field of Classification Search .................. 381/79, 381/92, 122, 315, 316, 323, 320, 312, 111; 455/93, 112, 113, 69, 522, 68, 633, 71, 118, 455/63, 3.06

See application file for complete search history.

(56) References Cited

U.S. PATENT DOCUMENTS

| | | | | |
|---|---|---|---|---|
| 4,972,439 A * | 11/1990 | Kuznicki et al. | ............ | 375/296 |
| 5,319,716 A * | 6/1994 | McGreevy | .................. | 381/79 |
| 6,778,814 B2 * | 8/2004 | Koike | ......................... | 455/95 |

FOREIGN PATENT DOCUMENTS

| | | |
|---|---|---|
| DE | 38 36 294 A | 2/1990 |
| DE | 295 12 395 U | 11/1996 |
| DE | 100 40 660 A | 2/2001 |

* cited by examiner

*Primary Examiner*—Devona E Faulk

(74) *Attorney, Agent, or Firm*—Pearne & Gordon LLP

(57) ABSTRACT

A wireless transmitter includes an antenna and a signal generator. A control signal input to the signal generator controls a frequency band of a carrier frequency. The control signal also controls the transmitted signal power. The control signal is generated by a decoder unit that decodes an audio signal.

12 Claims, 3 Drawing Sheets

WIRELESS TRANSMITTER AND HEARING SYSTEM

BACKGROUND OF THE INVENTION

The present invention departs from problems recognized at so-called "wireless microphones". We understand under a wireless microphone a system consisting of a transmitter unit with an input microphone arrangement and of a hearing device with a respective wireless receiver.

Audio signals perceived by the microphone arrangement of the transmitter unit, remote from the hearing device and e.g. carried at an individual's belt are wirelessly transmitted to the receiver of individual's hearing device, by means of a carrier frequency signal modulated with the audio signal as is perceived by the microphone.

In the hearing device, the audio-signal-modulated carrier frequency signal is demodulated and the audio signal recaptured is operationally connected to an electrical to mechanical converter of the hearing device, as to a loudspeaker unit.

Nevertheless, the problems and objects defined over such a system do also apply to other wireless transmitter units than those forming a part of wireless microphone systems, and the present invention therefore presents also solutions for such other wireless transmitters.

Wireless transmitters often have the option to transmit via their antennas on one hand with different, selectable carrier frequencies within one frequency band, but also within different frequency bands, also called channels. The frequency bands usable of such transmitters are usually hardwired within the transmitter and may be changed by means of switches.

Nevertheless, a lot of countries legally restrict the frequency bands, which may be used for instance without special permission and additionally often also limit the power, i.e. the effectively radiated power (ERP) for transmitted signals, which do not require such special permission fee or tax. These restrictions are often different from country to country.

BRIEF SUMMARY OF THE INVENTION

If the individual using the transmitter has free access to the carrier frequency band selector and thus to the frequency band exploited, he is likely to infringe the respective local regulations, even inadvertently. As a solution of this problem it would be possible to specifically tailor the transmitter for the respective country such that the user may not select another frequency band than the locally prescribed one, may only select carrier frequencies within that specific band, and also may not select higher output power than prescribed. This of course poses severe infrastructural, logistical as well as production problems to the manufacturer, which significantly raise the production price.

Furthermore, one and the same transmitter should be usable internationally as a respective individual customarily travels from country to country.

Instead of hardwiring the respective frequency band, the information about a selectable frequency band and, possibly, a derived power level may be stored in a memory, as e.g. in a non-volatile and re-programmable memory, as an electrically erasable, programmable read-only memory (EEPROM). This has the advantage that this information and other possibly prescribed radiation parameters for the transmitter may be programmed in a late stage of production by physically establishing by EEPROM-programming the respective connections within the transmitter. However, in case of frequency band reallocation in an other country the transmitter must be collected and reprogrammed by a specialized center.

It is an object of the present invention to provide a safe and flexible way to set the frequency band and/or the effectively radiated power of a transmitter by untrained people and without using sophisticated procedures like EEPROM programming by specialized people.

This is achieved by the wireless transmitter according to the present invention, which comprises an antenna and a transmitter signal generator unit generating a signal to be transmitted at an output and having a control input. A control signal applied to this control input controls at least one of the frequency band wherein the at least one carrier frequency resides of the transmitted signal and of the power of the transmitted signal. The output of the generator unit is thereby connected to the antenna. There is further provided an audio signal to control signal decoder unit, which generates a control signal at an output in response to an encoded audio signal at its input. The output of the decoder unit is thereby operationally connected to the control input of the generator unit.

Thereby, we understand under an audio signal a signal which, generically spoken, may be converted by a microphone or, more general, a mechanical to electrical converter, and thereby considering ultra-sonic microphones too, goes up to ultra-sonic frequencies. Nevertheless, in a most preferred embodiment we understand under audio signals in the frequency range of 100 Hz up to 20 kHz. Thereby an encoded audio signal is not modulated upon a high-frequency carrier signal. An example of such encoding audio signal, which is also preferably used in the present invention, is the so-called DTMF, dual-tone multi-frequency encoding, which is widely known in the telephony technology.

Thus, such encoded audio signal may be output at any audio output and input to any audio input of respective devices.

According to the wireless transmitter of the present invention, selection of the respectively used frequency band and/or radiation power is controlled by the encoded audio signal. Due to the fact that respective encoding of the audio signal is e.g. only known to the manufacturer of the transmitter or to respectively licensed centers, it nevertheless becomes possible to easily reprogram the transmitter on the respective locally admitted frequency band and/or radiation power by the individual user. A respective audio-signal source is e.g. purchased from the manufacturer as e.g. a CD. The individual retrieves e.g. with entering a country code from such audio source the respectively encoded audio signal to the transmitter, which, via the audio signal to control signal decoder, reprograms his transmitter on the respective local requirements with respect to frequency band and/or radiation power.

In a first preferred embodiment of the wireless transmitter according to the present invention, the input of the decoder unit is operationally connected to at least one audio signal input tab of the wireless transmitter. At this tab the encoded audio signal may be applied generically from an audio output of whatever audio signal source is selected.

Thereby, this input tab is connectable to at least one external audio signal source. Such an audio signal source may thereby preferably be at least one of a microphone, an internet connection device, an audio player as e.g. an MP3 player, a CD player, a tape player, a DVD player etc.

If the audio signal tab of the wireless transmitter is e.g. connected to a microphone, it becomes possible to enter the encoded audio signal on request via a telephone connection and thereby using acoustical coupler technique. If the tab is connected to the acoustical output of an internet connection device as to a computer or laptop's audio output, on respective request the user may receive e.g. from manufacturer's server the respectively encoded audio signal file and the transmitter is reprogrammed on the respective local requirements. By connecting the said tab of the wireless transmitter to an audio player audio output and by providing an audio signal carrier or storage medium for such player, e.g. with country-specific encoded audio signals, the individual user may easily reprogram his wireless transmitter by entering e.g. on the basis of a country-selection code the respectively encoded audio signal to his individual transmitter.

In a further preferred embodiment of the wireless transmitter according to the present invention the generator unit comprises a modulator unit with a carrier frequency signal input and with an output. The output of the modulator unit is thereby operationally connected to the output of the generator unit and thus to the antenna of the transmitter. The modulator unit has further a modulation input which is operationally connected to the input of the audio signal to control signal decoder unit.

By this preferred embodiment and with an eye on the above explained wireless microphone arrangement, the audio signal input of the wireless transmitter is used on one hand for programming the respective frequency band and/or radiation power if a respectively encoded audio signal is applied thereto, and on the other hand an audio input acts on the modulation unit, so that the received audio input signal is modulated upon the carrier frequency signal and is transmitted to a respective receiver, especially to the receiver of an ear device of a wireless microphone system.

Thereby, the transmitted signal may be realized by one of the known modulation techniques, as especially by amplitude modulation, frequency modulation, phase modulation or a pulse modulation technique.

In a further preferred embodiment of the inventive transmitter, a microphone operationally connected to the audio input of the audio signal to control signal decoder is integrated in the transmitter itself. In a further preferred embodiment the encoded audio signal is formed by a dual-tone multi-frequency-encoded audio signal. Thereby, although the inventive teaching may be applied up to ultra-sonic audio-signals, in a preferred mode the addressed audio signals and thereby the addressed encoded audio signals are within the frequency range of 100 Hz to 20 kHz.

Although the one or all frequency bands to be selected may contain just one carrier frequency so that, in fact, instead of selecting a frequency band, just a carrier frequency may be selected, in a most preferred embodiment at least one frequency band to be selected contains more than one preselected carrier frequency. The carrier frequency to be applied is then selected, within the selected frequency band, by the individual. Most preferably the encoded audio signal thereby defines, at least within one of the frequency bands, more than one discrete carrier frequency.

The present invention further specifically addresses a wireless hearing system, which comprises on one hand an ear device with a wireless receiver unit operationally connected to an electrical to mechanical output converter. There is further provided the wireless transmitter as described and defined above, transmitting signals which are receivable and demodulatable at the ear device.

Further, the present invention provides for an audio signal carrier or storage medium, as e.g. a CD, a tape with a multitude of country-specific encoded audio signal files.

BRIEF DESCRIPTION OF THE DRAWINGS

The present invention shall now be described in more details by way of examples and by means of figures.

The figures show.

DETAILED DESCRIPTION OF THE INVENTION

Figure 1:
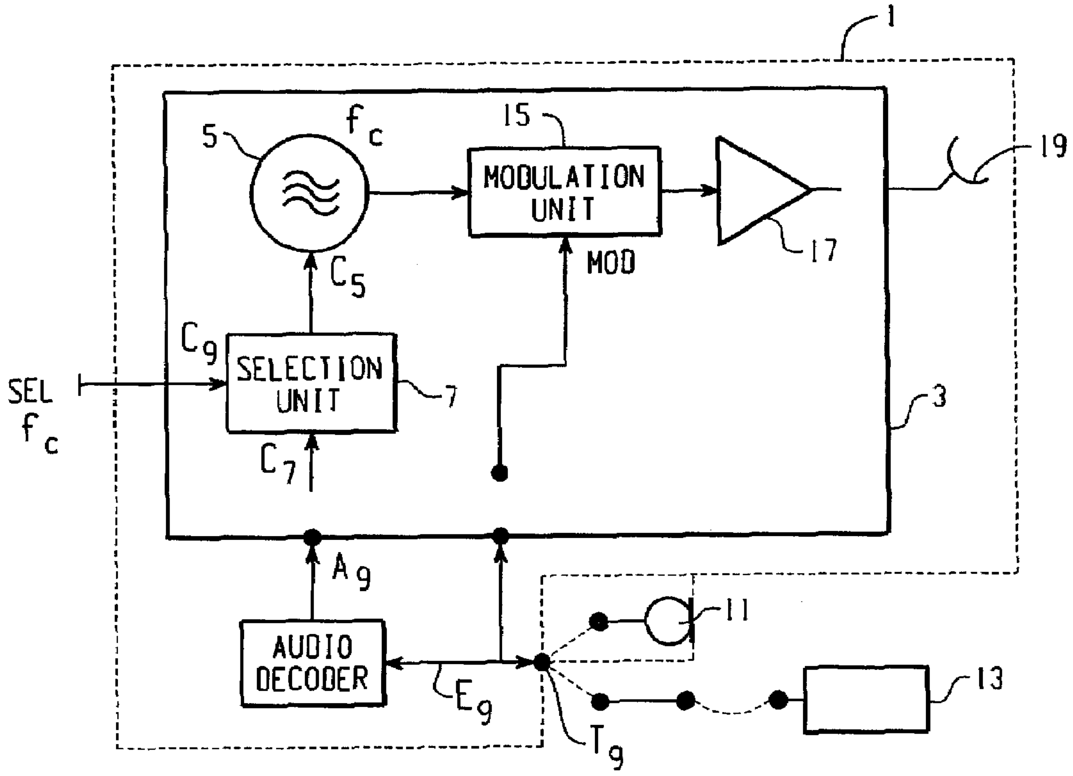
FIG. 1 by means of a simplified signal flow/functional block diagram a first embodiment of a transmitter according to the present invention for inventively selecting the frequency band of wireless transmission.

According to FIG. 1, which shows a first embodiment of the wireless transmitter according to the present invention, this wireless transmitter is shown in a dashed line frame and denoted with ref. No. 1. The transmitter 1 comprises a transmitter signal generator unit 3. First generically addressing the present invention, the generator unit 3 comprises a carrier frequency signal generator unit 5 with a carrier frequency control input $C_5$. The carrier frequency control input $C_5$ is connected to a frequency band and carrier frequency selection unit 7, which has a control signal input $C_7$. By means of a control signal applied to control input $C_7$ first the frequency band, within which the transmitter 1 shall transmit, is selected. This is performed either by the control signal applied to $C_7$ controlling switches which enable a respective preprogrammed frequency band within unit 7.

Thus, in this case all the frequency bands, which possibly should be applicable, are preprogrammed in unit 7 and the control signal applied to $C_7$ merely performs a selection, which of the preprogrammed frequency bands shall be enabled.

In an other more preferred approach no frequency band is preprogrammed in unit 7. By means of the control signal applied to $C_7$ the unit 7 is programmed on that frequency band to be used. Thus by this preferred approach one frequency band information set is momentarily present in the transmitter 1.

Within the respective frequency bands customarily more than one discrete carrier frequency is selectable. If in a frequency band only one carrier frequency $f_c$ shall be selectable, then the control signal at $C_7$ may clearly directly control selection of that carrier frequency. If more than one carrier frequency $f_c$ shall be selectable in at least one of the frequency bands as selectable or programmable by control signal applied to $C_7$, then the control signal to $C_7$ defines for these possible carrier frequencies. Preferably by means of a manually operable key 8 as schematically shown in FIG. 7 the specific carrier frequency $f_c$ to be momentarily applied is selected.

Thus, in any case as described, a control signal applied to $C_7$ determines the frequency band to be activated in unit 7 and within that frequency band, by means of key 8 and a respective control signal to $C_8$ of unit 7, the individual selects the discrete carrier frequency preferably out of a number of carrier frequencies which are co-defined by the control signal applied to $C_7$.

The control input $C_7$ is thereby operationally connected to the output $A_9$ of an audio signal/control signal decoder unit 9. The decoder unit 9 has an audio input $E_9$, which is operationally connected to an input tab $T_9$ of the transmitter 1 for inputting audio signals.

The audio signal input tab $T_9$ of the transmitter 1 may thereby be connected to an audio signal source, thereby preferably to an external microphone or acoustical to electrical converter 11 and/or to a further source 13 of audio signals, as especially to an audio output of an internet connection device, of an audio player, as e.g. of an MP3 player, of a CD player, of a tape player, of a DVD player etc.

Nevertheless, in a preferred mode of the inventive transmitter there is provided at the transmitter 1 itself a built-in or integrated microphone or acoustical to electrical converter 11 directly hardwired in operational connection with the audio input of the audio signal to control signal decoder unit 9.

By means of inputting an encoded audio signal to the audio input tab $T_9$ and/or to the built-in converter 11 of the transmitter 1 and by decoding this audio signal input there is generated at the output of the audio signal to control signal decoder unit 9 a band-selection control signal. By this signal preferably defining additionally for the specific carrier frequencies usable within that band and by carrier frequency selection by the control signal applied to control input $C_8$ of unit 7, the according discrete carrier frequency $f_c$ is selected and the carrier frequency signal generator 5 is controlled to operate on that selected carrier frequency $f_c$. The carrier frequency signal is applied to a modulation unit 15, where the carrier frequency signal is modulated as a function of a modulation signal applied to modulation input mod of modulation unit 15. The modulated carrier frequency signal is then—via an output amplification stage 17—operationally connected to a transmission antenna 19 of the transmitter 1.

Thereby and in a most preferred mode of the transmitter 1 according to the present invention the modulation input mod of the modulation unit 15 is operationally connected to the audio signal input $E_9$ of the audio signal to control signal decoder unit 9. Thus, an audio signal applied to audio input tab $T_9$ of the transmitter 1 is either modulated upon the carrier frequency signal as generated by generator 5 and then transmitted via antenna 19 or—if respectively encoded—is recognized by the audio signal to control signal decoder unit 9, decoded into a respective control or programming signal, which, as was explained, selects the respective frequency band and defines for the $C_8$-selectable carrier frequencies within that band to be applied.

The same is obviously valid if a microphone or acoustical to mechanical converter 11 is integrated in the transmitter 1 as according to a preferred mode of such transmitter.

Figure 2:
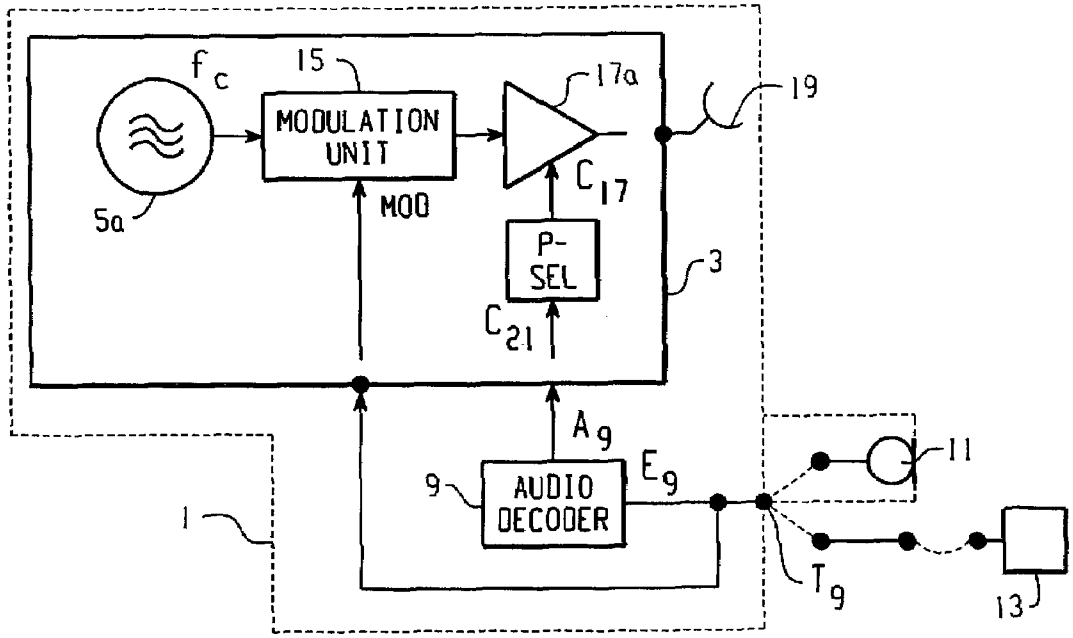
FIG. 2 in a representation in analogy to that of FIG. 1, a further embodiment of the transmitter according to the present invention for inventive selection of effectively radiated output power.

In FIG. 2 there is shown a further embodiment of the transmitter 1 according to the present invention. The same reference numbers as already used in FIG. 1 are applied for the same inputs, outputs and units.

According to this embodiment there is used one fixed, preselected carrier frequency $f_c$. The carrier frequency signal generator 5*a* thereby generates again the carrier frequency signal to be modulated at modulator unit 15. The output amplification stage 17*a* has, in contrary to the embodiment of FIG. 1, an output power selection control input $C_{17}$ operationally connected to the output of a power level selection unit 21. The control signal input $C_{21}$ of power level selection unit 21 is operationally connected to the control signal output $A_9$ of the audio signal to control signal decoder unit 9. Again the audio input $E_9$ of this decoder unit 9 is operationally connected to an audio signal input tab $T_9$ of the transmitter 1, being connectable to an audio output of an external microphone 11 or of an acoustical to electrical converter and/or to the audio output of another audio signal source as was described in connection with FIG. 1. Nevertheless, in the preferred embodiment again there is provided a microphone 11 or acoustical to electrical converter integrated in the transmitter 1 and hardwired in operational connection with audio input $E_9$ of audio signal to control signal decoder unit 9.

In analogy to the explanations with respect to FIG. 1 in this embodiment by respective encoded audio signals applied either to integrated microphones and/or to audio input tab $T_9$ and by respective decoding via decoder unit 9 the output power level of the signals transmitted via antenna 19 is selected and realized by e.g. appropriate adjustment of output amplifier stage 17*a*.

Again in a preferred embodiment as shown in FIG. 2 too the audio input to the decoder unit 9 is operationally connected to the modulation input mod of modulation unit 15.

Figure 3:
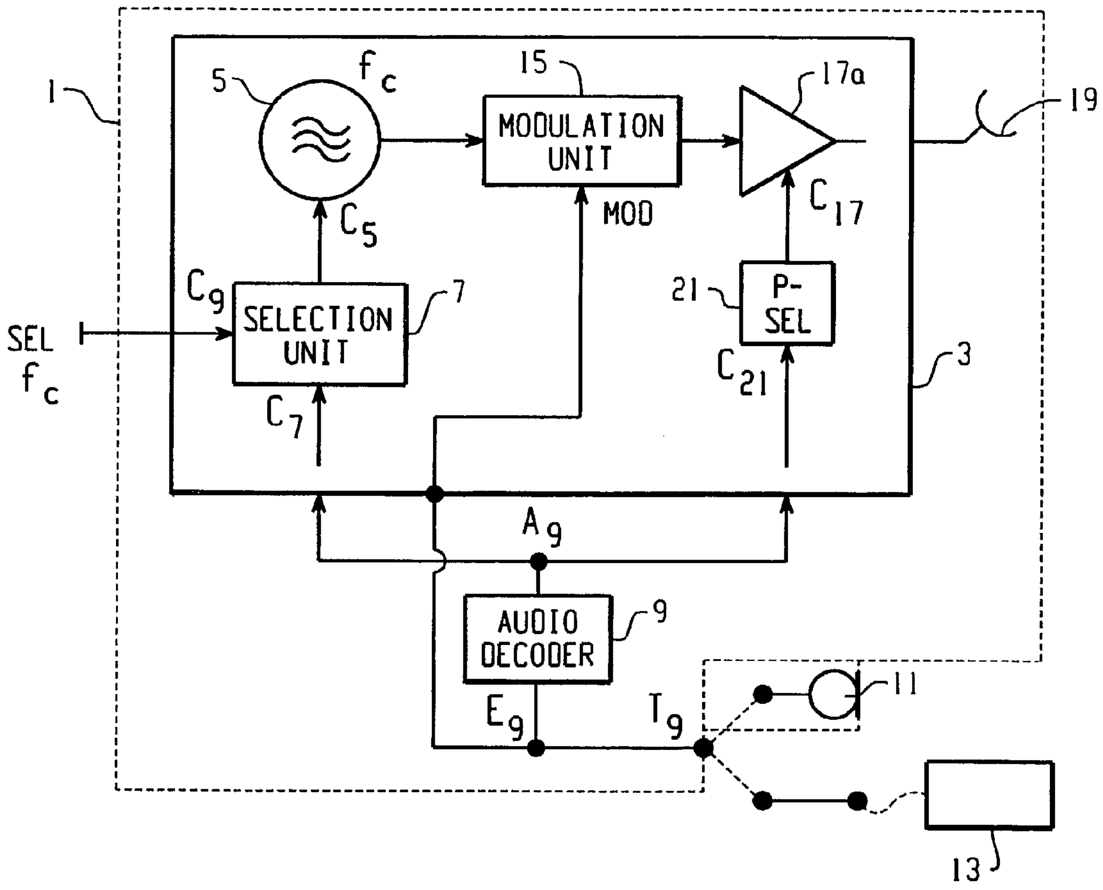
FIG. 3 in a representation in analogy to that of the FIGS. 1 and 2, a preferred embodiment of the transmitter according to the present invention for selecting frequency band of transmitted signals and effectively radiated output power of the transmitted signal.

In FIG. 3 there is shown in an analogous representation to those of FIGS. 1 and 2 a preferred embodiment of the transmitter 1 according to the present invention, wherein the embodiment of FIG. 1, namely encoded audio signal controlled band selection, and the embodiment of FIG. 2, namely encoded audio signal controlled output power of transmitted signal, are both combined. The same reference numbers as of FIGS. 1 and 2 are applied, so that no further explanations are necessary for the skilled artisan and with respect to FIG. 3.

Modulation of the carrier frequency signal as generated by the generator units 5 and 5*a* respectively is performed at the modulation unit 15 and as a function of a signal applied to its modulation input mod in one of well-known modulation techniques, as especially by amplitude modulations frequency modulation, phase-, respectively angle-modulation or by a pulse modulation technique. As was mentioned above encoding of the audio signal applied to audio input tab $T_9$ and/or to a built-in microphone and thereby led to the input of the audio signal to control signal decoder unit 9 is preferably performed by dual-tone multi-frequency encoding.

Figure 4:
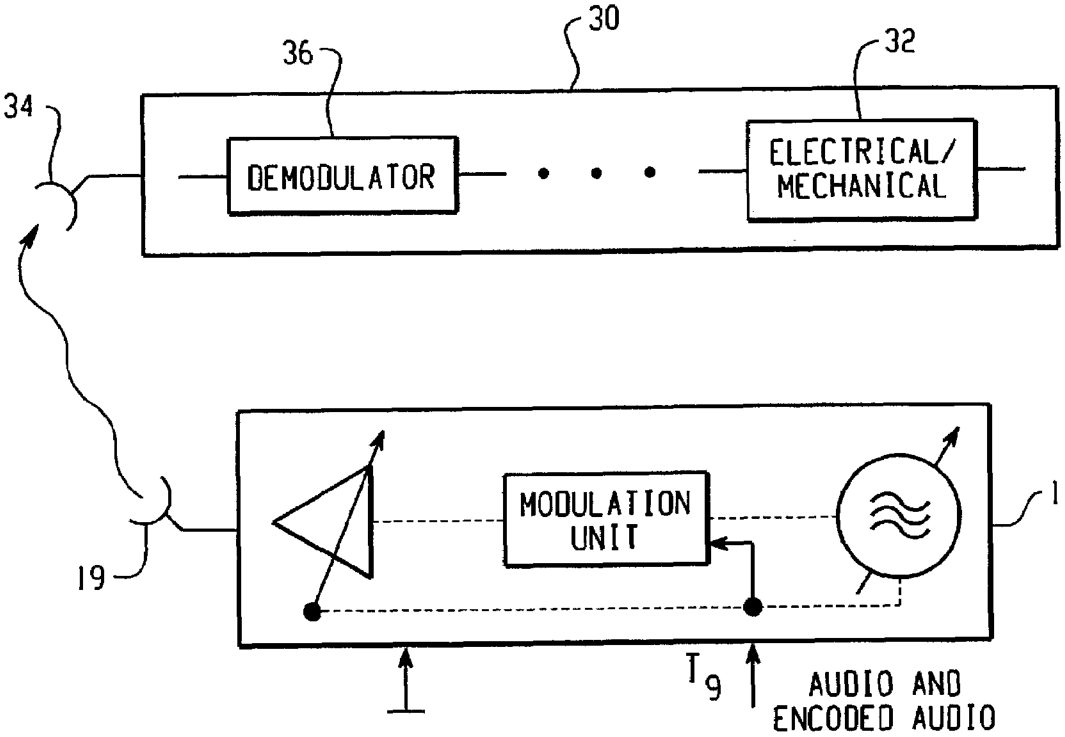
FIG. 4 schematically, a wireless hearing system according to the present invention, basically consisting of a hearing device with wireless receiver and with a transmitter according to the present invention, and FIG. 5 schematically, the file structure of an audio signal carrier according to the present invention for user-based programming of the transmitter according to the present invention.

In FIG. 4 there is schematically shown a hearing system according to the present invention. Such system consists of at least one ear device 30 with an electrical/mechanical output converter 32 acting on an individual's ear. The ear device 30 comprises, as schematically shown, a receiver unit with a reception antenna 34 and a demodulator DEM unit 36. The system further comprises a wireless transmitter 1 according to the other aspect of the present invention, and as was described with the help of the FIGS. 1 to 3, not further described here. An audio signal applied to the audio input tab $T_9$ of the transmitter or to its built-in microphone according to the present invention primarily modulates the carrier frequency signal. The audio signal modulated carrier frequency signal is transmitted via transmitter antenna 19 to receiver antenna 34 of the ear device 30.

Thereby, audio signals applied to the integrated microphone and/or to the audio input tab $T_9$ are wirelessly transmitted to the ear device 30 and may be listened at by the user. The respective transmission frequency band and/or the transmitted signal power is selected by applying as was described with the help of FIGS. 1 to 3 an encoded audio signal to the audio input tab $T_9$ and/or built-in hardwire microphone. Selection of a discrete carrier frequency is preferably performed manually, e.g. at key 8.

Figure 5:
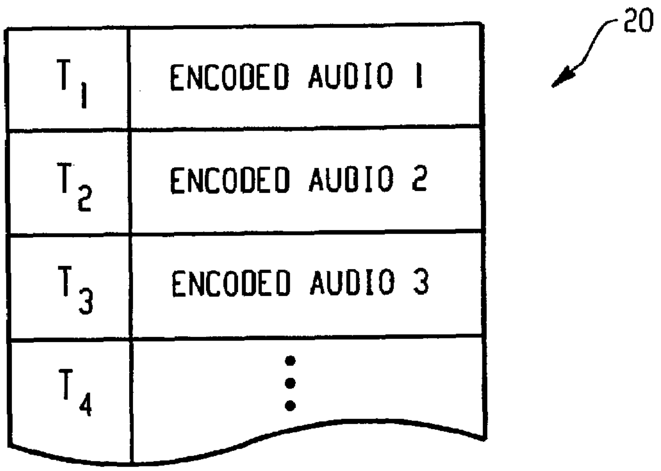

As was mentioned above, the user of a transmitter according to FIGS. 1 to 3 and/or of a hearing system as according to FIG. 4 may easily reprogram transmitter 1 with respect to frequency band—therein applicable carrier frequencies—and/or transmission power. This may e.g. be done by providing an audio signal carrier 20 to the individual as e.g. a CD. On such a carrier different encoded audio signal files are stored, as schematically shown in FIG. 5, for a CD e.g. on different tracks.

The invention claimed is:

1. A wireless transmitter comprising:

an antenna;

a transmitter signal generator unit generating a signal to be transmitted at an output and having a control input, a control signal applied to said control input controlling at least one of a frequency band and of a power level of said signal to be transmitted;

said output of said generator unit being operationally connected to said antenna;

an audio signal/control signal decoder unit, said decoder unit generating said control signal at an output of said decoder unit in response to an encoded audio signal at an input of said decoder unit;

said output of said decoder unit being operationally connected to said control input of said generator unit;

said generator unit comprising a modulator unit with a carrier frequency signal input and an output, the output of the modulator unit being operationally connected to said output of said generator unit and having a modulation input, said modulation input being operationally connected to said input of said decoder unit for receiving said encoded audio signal; and said input of said decoder unit being operationally connected to said output of said generator unit, via said modulation input, for wirelessly transmitting audio content of said encoded audio signal.

2. The transmitter according to claim 1, said input of said decoder unit being operationally connected to at least one audio signal input tab of said wireless transmitter.

3. The transmitter of claim 2, said input tab being connectable to at least one external audio signal source.

4. The transmitter of claim 3, wherein said audio signal source is at least one of a microphone;

an audio player; and an internet connection device.

5. The transmitter of claim 1, wherein said generator unit generating said signal to be transmitted as an amplitude-modulated signal, a frequency-modulated signal, a phase-modulated signal or a modulated pulse signal.

6. The transmitter of claim 1, further comprising at least one microphone, an output thereof being operationally connected to said input of said decoder unit.

7. The transmitter of claim 1, wherein said encoded audio signal is a dual-tone multi-frequency signal.

8. The transmitter of claim 1, wherein said decoder receives an encoded audio signal in a frequency range of 100 Hz to 20 kHz (both limits included).

9. The transmitter of claim 1, wherein said frequency band comprises more than one carrier frequency of said signal to be transmitted.

10. The transmitter of claim 9, further comprising a manually operable selection unit with an output operationally connected to a control input of a carrier frequency generator unit, said control input controlling selection of the carrier frequency of said signal to be transmitted, out of said more than one carrier frequency.

11. The transmitter of claim 1, wherein said encoded audio signal defining more than one carrier frequency in said frequency band.

12. A hearing system comprising an ear device with an output electrical to mechanical converter and with a wireless receiver, the output thereof being operationally connected to said electrical to mechanical converter; a wireless transmitter according to one of the claims 1 to 4, 5 to 11, a signal transmitted from said wireless transmitter being received and demodulated at said ear device and acting on said electrical to mechanical converter.

* * * * *

UNITED STATES PATENT AND TRADEMARK OFFICE

CERTIFICATE OF CORRECTION

PATENT NO. : 7,599,705 B2
APPLICATION NO. : 09/940401
DATED : October 6, 2009
INVENTOR(S) : Marquis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1290 days.

Signed and Sealed this

Twenty-eighth Day of September, 2010

David J. Kappos

*Director of the United States Patent and Trademark Office*